(12) United States Patent
Hagiwara et al.

(10) Patent No.: US 9,455,061 B2
(45) Date of Patent: Sep. 27, 2016

(54) CARBON NANOFIBER DISPERSION LIQUID, COATING COMPOSITION, AND PASTE COMPOSITION

(75) Inventors: Masahiro Hagiwara, Akita (JP); Osamu Sakaya, Akita (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 404 days.

(21) Appl. No.: 13/882,309

(22) PCT Filed: Oct. 28, 2011

(86) PCT No.: PCT/JP2011/074925
§ 371 (c)(1),
(2), (4) Date: Apr. 29, 2013

(87) PCT Pub. No.: WO2012/060292
PCT Pub. Date: May 10, 2012

(65) Prior Publication Data
US 2013/0221284 A1 Aug. 29, 2013

(30) Foreign Application Priority Data
Nov. 2, 2010 (JP) ................................. 2010-246416

(51) Int. Cl.
| | | |
|---|---|---|
| *H01B 1/24* | (2006.01) | |
| *C09D 5/24* | (2006.01) | |
| *C09C 1/44* | (2006.01) | |
| *C09D 7/12* | (2006.01) | |
| *C01B 31/02* | (2006.01) | |
| *B82Y 30/00* | (2011.01) | |
| *B82Y 40/00* | (2011.01) | |
| *C08K 3/04* | (2006.01) | |
| *C08K 5/05* | (2006.01) | |
| *C08K 5/17* | (2006.01) | |
| *C08K 5/5317* | (2006.01) | |
| *C08K 7/06* | (2006.01) | |

(52) U.S. Cl.
CPC ................ *H01B 1/24* (2013.01); *B82Y 30/00* (2013.01); *B82Y 40/00* (2013.01); *C01B 31/0273* (2013.01); *C09C 1/44* (2013.01); *C09D 5/24* (2013.01); *C09D 7/1233* (2013.01); *C09D 7/1291* (2013.01); *C01P 2002/72* (2013.01); *C01P 2002/77* (2013.01); *C01P 2004/13* (2013.01); *C01P 2004/54* (2013.01); *C01P 2004/64* (2013.01); *C01P 2006/40* (2013.01); *C08K 3/04* (2013.01); *C08K 5/05* (2013.01); *C08K 5/17* (2013.01); *C08K 5/175* (2013.01); *C08K 5/5317* (2013.01); *C08K 7/06* (2013.01)

(58) Field of Classification Search
CPC ............ H01B 1/00; H01B 1/24; B05D 5/12; C01B 31/0233; C09D 5/24
See application file for complete search history.

(56) References Cited

U.S. PATENT DOCUMENTS

| | | | |
|---|---|---|---|
| 2010/0096972 A1* | 4/2010 | Shigeta et al. | 313/346 R |
| 2011/0003721 A1* | 1/2011 | Hong et al. | 508/113 |
| 2012/0132861 A1* | 5/2012 | Tamamitsu et al. | 252/507 |

FOREIGN PATENT DOCUMENTS

| | | |
|---|---|---|
| CN | 1445373 A | 10/2003 |
| CN | 1777615 A | 5/2006 |
| CN | 101065453 A | 10/2007 |
| EP | 1947153 A1 | 7/2008 |
| EP | 2117012 A1 | 11/2009 |
| JP | 2000-144009 A | 5/2000 |
| JP | 2003-026981 A | 1/2003 |
| JP | 2005-113091 A | 4/2005 |
| JP | 2006-327878 A | 12/2006 |
| JP | 2007-513861 A | 5/2007 |
| JP | 2007-169121 A | 7/2007 |
| JP | 2007-169374 A | 7/2007 |
| JP | 2008-138039 A | 6/2008 |
| JP | 2009-067933 A | 4/2009 |
| JP | 2010-163568 A | 7/2010 |
| JP | 2010-195671 A | 9/2010 |
| WO | WO-2005/056474 A1 | 6/2005 |
| WO | WO-2009/008486 A1 | 1/2009 |

OTHER PUBLICATIONS

Thomas et al., "Natural Rubber Materials, vol. 2—Composites and Nanocomposites", p. 38 (2014)).*
Daoush W M et al: "Coated powders 'a good base' for intermetallics," Metal Powder Report, MPR Publishing Services, Shrewsbury, GB, vol. 63, No. 11, Dec. 2, 2008, pp. 16-18.
Supplementary European Search Report dated Apr. 25, 2014, issued for the European patent application No. 11837942.9.
Daoush W M et al: "Coated powders 'a good base' for intermetallics," Metal Powder Report, MPR Publishing Services, Shrewsbury, GB, vol. 63, No. 11, Dec. 1, 2008, pp. 16-18.
International Search Report dated Nov. 22, 2011, issued for PCT/JP2011/074925 and English translation thereof.
Office Action dated Mar. 17, 2014, issued for the Chinese patent application No. 201180052509.5 and English translation of the Search Report.
Notice of Reasons for Rejection issued in corresponding Japanese Patent Application No. JP 2011-235912, dated Aug. 18, 2015.

* cited by examiner

*Primary Examiner* — Mark Kopec
(74) *Attorney, Agent, or Firm* — Locke Lord LLP; James E. Armstrong, IV; Nicholas J. DiCeglie, Jr.

(57) ABSTRACT

A carbon nanofiber dispersion liquid having an excellent dispersibility and dispersion stability. Also, coating paste compositions including the carbon nanofibers produced by using the dispersion liquid are provided. The carbon nanofiber dispersion liquid includes: a solvent; a carbon nanofiber; an alkanolamine; and a chelating agent. Preferably, in the carbon nanofiber dispersion liquid, the alkanolamine is at least one selected from a group consisting of monoisopropanolamine, diisopropanolamine, and triisopropanolamine. Also, in the carbon nanofiber dispersion liquid, the chelating agent is at least one selected from a group consisting of an aminocarboxylic acid chelating agent, a phosphonic acid chelating agent, a gluconic acid chelating agent, and an organic acid.

20 Claims, No Drawings

CARBON NANOFIBER DISPERSION LIQUID, COATING COMPOSITION, AND PASTE COMPOSITION

TECHNICAL FIELD

The present invention relates to a carbon nanofiber dispersion liquid capable of forming a coating film with an excellent conductive property, a coating composition, and a paste composition.

Priority is claimed on Japanese Patent Application No. 2010-246416, filed Nov. 2, 2010, the content of which is incorporated herein by reference.

BACKGROUND ART

Presently, varieties of carbon nanomaterials represented by the carbon nanotube have been developed. The carbon nanomaterials are regarded as a promising material with a variety of functions in various applications such as conductive fillers, heat-conducting materials, light-emitting elements, electrode materials of a capacitor or battery, junction electrode materials of wiring materials or wirings, reinforcement materials, and black pigments.

However, the carbon nanomaterials form aggregates generally when they are produced, making it very difficult to disperse them sufficiently. Because of this, the advantageous properties of the carbon nanomaterials cannot be obtained fully when a product made of the carbon nanomaterials is manufactured.

Conventional methods to improve the dispersibility of the carbon nanomaterials are disclosed, for example, in three patent literatures, JPA-2007-169121, JPA-2008-138039, and JPA-2009-67933.

In the method disclosed in JPA-2007-169121, the carbon nanotubes are dispersed by using a non-ionic dispersing agent prepared in such a way that the amine number of the dispersing agent is set within a predetermined range. In the method disclosed in JPA-2008-138039, polyimide varnish, in which the carbon nanofibers are dispersed in the presence of a dispersing agent and an amine compound, is used. In the method disclosed in JPA-2009-67933, a carbon nanotube coating composition containing an organic dye derivative or a triazine derivative having an acidic functional group, and a dispersion resin with an amino group is used. However, the dispersibility of the carbon nanofiber is not sufficient in the presence of highly concentrated carbon nanofibers in these conventional methods. In particular, the dispersion stability has plenty of room for improvement.

DISCLOSURE OF INVENTION

Problems to be Solved by the Invention

The present invention is made under the circumstance described above. The purpose of the present invention is to provide a carbon nanofiber dispersion liquid having an excellent dispersibility and dispersion stability, a coating composition and a paste composition including the carbon nanofibers produced by using the dispersion liquid.

Means for Solving the Problems

The present invention relates to a carbon nanofiber dispersion liquid, a coating composition and a paste composition including the carbon nanofibers produced by using the dispersion liquid, which are configured as described below. The above-mentioned problem can be solved by configuring them as described below.

(1) A carbon nanofiber dispersion liquid including: a solvent; a carbon nanofiber; an alkanolamine; and a chelating agent.

(2) The carbon nanofiber dispersion liquid according to (1) described above, wherein the alkanolamine is at least one selected from a group consisting of, monoisopropanolamine, diisopropanolamine, and triisopropanolamine.

(3) The carbon nanofiber dispersion liquid according to (1) or (2) described above, wherein the chelating agent is at least one selected from a group consisting of an aminocarboxylic acid chelating agent, a phosphonic acid chelating agent, a gluconic acid chelating agent, and an organic acid.

(4) The carbon nanofiber dispersion liquid according to any one of (1) to (3) described above, wherein 0.1 to 40 parts by mass of the alkanolamine is included in 100 parts by mass of the carbon nanofiber dispersion liquid.

(5) The carbon nanofiber dispersion liquid according to any one of (1) to (4) described above, wherein 0.01 to 10 parts by mass of the chelating agent is included in 100 parts by mass of the carbon nanofiber dispersion liquid.

(6) The carbon nanofiber dispersion liquid according to any one of (1) to (5) described above, wherein a diameter of the carbon nanofiber is 1 to 100 nm, an aspect ratio of the carbon nanofiber is 5 or more, and a distance of [002] lattice plane in a graphite layer of the carbon nanofiber is 0.35 nm or less, the distance being measured by X-ray diffraction.

(7) A coating composition comprising the carbon nanofiber dispersion liquid according to any one of (1) to (6) described above, and a binder component.

(8) A paste composition comprising the carbon nanofiber dispersion liquid according to any one (1) to (6) described above, and a binder component.

(9) A conductive coating film formed by one of the coating composition according to (7) described above or the paste composition according to (8) described above.

Effects of the Invention

According to the carbon nanofiber dispersion liquid described in (1) above and being an aspect of the present invention, a carbon nanofiber dispersion liquid, in which the carbon nanofibers are in an ideal dispersion state where the carbon nanofibers are dispersed evenly, can be provided. Also, the carbon nanofiber dispersion liquid has an excellent dispersion stability. Therefore, materials having a more uniform conductivity can be obtained easily compared to the conventional methods by using the dispersion liquid. According to the carbon nanofiber dispersion liquid described in (6) above and being other aspect of the present invention, materials with a higher conductivity can be obtained easily by defining material characteristics of the dispersed carbon nanofiber. According to the coating or paste compositions described in (7) or (8) above and being other aspects of the present invention, a conductive coating film with a uniform conductivity can be produced easily.

BEST MODE FOR CARRYING OUT THE INVENTION

The present invention is explained specifically on the basis of the present embodiments below. Here, "%" in the specification indicates "% by weight" as long as it is not particularly indicated, or it simply indicates a specific ratio itself.

[Carbon Nanofiber Dispersion Liquid]

The carbon nanofiber dispersion liquid of the present invention includes a solvent, a carbon nanofiber, an alkanolamine, and a chelating agent.

Carbon nanofibers having varieties of diameters and structures can be synthesized by catalytic chemical vapor deposition methods using a catalyst such as a metal particulate or the like. The catalyst acts as the origin of carbon nanofiber growth.

Alkanolamine improves dispersibility and the dispersion stability of the carbon nanofiber dispersion liquid by being combined with a chelating agent. This is because the wettability of the carbon nanofiber against the solvent is improved due to coordination of the chelating agent to the catalyst of the carbon nanofiber and interaction between the chelating agent and the alkanolamine. As examples of the alkanolamine, monoethanolamine, diethanolamine, triethanolamine, monopropanolamine, dipropanolamine, tripropanolamine, monoisopropanolamine, diisopropanolamine, triisopropanolamine, monobutanolamine, dibutanolamine, tributanolamine, N-methyl ethanolamine, N-methyl propanol amine, N-methyl isopropanolamine, and N-methyl butanolamine can be named. From the point of view of the dispersion stability, monoisopropanolamine, diisopropanolamine, and triisopropanolamine are preferable. Any one described above can be used solely as the alkanolamine. Alternatively, two or more of the alkanolamines described above can be combined to be used as the alkanolamine.

As examples of the chelating agent, the aminocarboxylic acid-based chelating agent, the phosphonic acid-based chelating agent, the gluconic acid-based chelating agent, and the organic acids can be named. As examples of the aminocarboxylic acid-based chelating agent, ethylenediaminetetraacetic acid (EDTA), diethylenetriaminepentaacetic acid (DTPA), hydroxyethyl ethylenediamine triacetic acid (HEDTA), nitrilotriacetic acid (NTA), 2-hydroxypropylenediamine disuccinic acid (HPDS), 2-hydroxypropylenediamine-N—N'-disuccinic acid (HPDDS), ethylenediamine-N,N'-disuccinic acid (EDDS), ethylenediaminediglutalic acid (EDGA), O,O'-bis(2-aminoethyl)ethyleneglycol-N,N,N',N',tetraacetic acid (EGTA) ethylenediamine-N,N'-diglutalic acid (EDDG), trans-1,2-diaminocyclohexane-N,N,N',N'-tetraacetic acid (CyDTA), and glycineamide-N,N'-disuccinic acid (GADS) can be named.

As examples of the phosphonic acid-based chelating agent, 1-hydroxy-ethylidene-1,1-diphosphonic acid (HEDP), 1-hydroxypropylidene-1,1-diphosphonic acid, 1,2-propanediaminetetra (methylene phosphonic acid), diethylenetriamine penta (methylene phosphonic acid), ethylenediamine bis(methylene phosphonic acid), amino tris (methylene phosphonic acid), and hexamethylenediamine tetra (methylene phosphonic acid) can be named. As examples of the gluconic acid-based chelating agent, gluconic acid, sodium gluconate, and calcium gluconate can be named. As examples of the organic acid, citric acid, oxalic acid, tartaric acid, and succinic acid can be named. In the point of view of dispersibility and dispersion stability, preferable chelating agents are hydroxyethylenediaminetriacetate, hydroxyethylidene-1,1-diphosphonic acid, gluconic acid, tartaric acid, and 1-hydroxypropylidene-1,1-diphosphonic acid. Any one described above can be used solely as the chelating agent. Alternatively, two or more of the chelating agents described above can be combined to be used as the chelating agent.

It is preferable that the fiber diameter of the carbon nanofiber is 1 to 100 nm, the aspect ratio of the carbon nanofiber is 5 or more, and the distance of [002] lattice planes in a graphite layer of the carbon nanofiber is 0.35 nm or less, the distance being measured by X-ray diffraction.

The carbon nanofibers having the fiber diameter and the aspect ratio as described above are dispersed in a solvent evenly. Also, they can form contact points sufficiently each other. Crystallinity of the carbon nanofibers having the graphite layer, in which the distance of [002] lattice planes is within the range described above, is high, the distance being measured by X-ray diffraction. Therefore, a material having a low resistance and a high conductivity can be obtained from the carbon nanofibers described above. From the point of view of ease of chelating agent's coordination, it is preferable that the catalyst used for carbon nanofiber preparation is one or more selected from the group consisting the Fe-based catalyst, the Ni-based catalyst, the Co-based catalyst, the Mn-based catalyst, the Cu-based catalyst, the Mg-based catalyst, the Al-based catalyst, and the Ca-based catalyst. It is more preferable the catalyst is one or more of the Fe-based catalyst, the FeCo-based catalyst, the FeMn-based catalyst, the FeAl-based catalyst, the CoMg-based catalyst, the FeCoAl-based catalyst, and the CoMnAlMg-based catalyst. Furthermore, an excellent conductivity can be obtained if the volume resistivity of the compact of the carbon nanofiber is 1.0 Ω·cm or less.

The fiber diameter of the carbon nanofiber described in the present specification is the mean mass diameter of particles (n=50) observed with a transmission-type electron microscope (100,000 times magnification). The aspect ratio of the carbon nanofiber can be obtained by dividing the mean particle diameter in the major axis by the mean particle diameter in the minor axis based on observation (n=50) with a transmission-type electron microscope (100,000 times magnification). In the measurement by X-ray diffraction, CuKα X-ray is used. The volume resistivity of the carbon nanofiber compact is measured with LORESTA HP manufactured by MITUBISHI CHEMICAL CO. and a powder measurement unit manufacture by DIAINSTRUMENTS CO., pressurized at 100 kgf/cm². The technical effect of the present invention can be obtained more effectively if a carbon nanofiber, which is manufactured by the vapor deposition method using carbon monoxide as the major raw material gas, is used for the carbon nanofiber. Carbon nanofibers having 95% or more of light transmittance of toluene can be obtained if the carbon nanofibers are manufactured by the vapor deposition method using carbon monoxide as the major raw material gas. Therefore, using the carbon nanofibers manufactured as described above is preferable from the point of view of dispersibility and transparency.

The carbon nanofiber dispersion liquid includes a solvent in addition to the above-mentioned alkanolamine and the chelating agent. The type of the solvent is not particularly limited. For example, the water-based solvent, the alcohol-based solvent, the ketone-based solvent, the ester-based solvent, or the like can be used. Among those, water, ethanol, isopropanol, cyclohexanone, ethyl acetate, N-methylpyrrolidone (NMP), butyl acetate, and methyl isobutyl ketone are preferable from the point of view of dispersibility.

It is preferable that the alkanolamine content is 0.1 to 40 parts by mass in 100 parts by mass of the carbon nanofiber dispersion liquid from the point of view of dispersibility and dispersion stability of the carbon nanofiber dispersion liquid. More preferably, the alkanolamine content is 1 to 30 parts by mass.

It is preferable that the chelating agent content is 0.01 to 10 parts by mass in 100 parts by mass of the carbon nanofiber dispersion liquid from the point of view of dispersibility and dispersion stability of the carbon nanofiber dispersion liquid. More preferably, the chelating agent content is 0.05 to 5 parts by mass.

It is preferable that the carbon nanofiber content is 0.01 to 20 parts by mass in 100 parts by mass of the carbon nanofiber dispersion liquid from the point of view of dispersibility and dispersion stability of the carbon nanofiber dispersion liquid. More preferably, the carbon nanofiber content is 3 to 20 parts by mass. If the carbon nanofiber content is less than 0.01 parts by mass, a sufficient conductivity cannot be obtained. On the other hand, if the carbon nanofiber content is more than 20 parts by mass, the carbon nanofibers cannot be dispersed sufficiently in the solvent.

If needed, varieties of commonly used additive agents can be included in the carbon nanofiber dispersion liquid to the level in which the purpose of the present invention is not deteriorated. Such additive agents include the leveling agents, the viscosity modifiers, the deformers, the curing agents, the antioxidants, and the like.

As the leveling agent, acryl-based copolymers, modified silicone-based materials, higher alcohols, or the like can be used.

As the viscosity modifier, hydroxyethyl cellulose, carboxymethyl cellulose, silica, or the like can be used.

As the deformer, fatty acid ester, phosphate ester, silicone oil, or the like can be used.

As the antioxidant, phenolic antioxidant, ascorbic acid, sodium erythorbate, or the like can be used.

The coating film formed by using the carbon nanofiber dispersion liquid of the present invention has a low haze value. Preferably, the haze value of the coating film is 10% or less. More preferably, it is 7% or less. Even more preferably, it is 5% or less. This carbon nanofiber dispersion liquid has an excellent dispersion stability. Preferably, the haze value of the carbon nanofiber dispersion liquid after 3 months storage at ordinary temperature and pressure is 10% or less. More preferably, it is 7% or less. Even more preferably, it is 5% or less. Agglomerated carbon nanofibers cause light scattering, increasing the haze value. When the carbon nanofibers are dispersed well, they are untied easily in a fibrous form. It is interpreted that the haze value can be reduced when the light scattering is suppressed by dispersing the carbon nanofiber well.

[Coating Composition and Paste Composition]

The coating composition and the paste composition can be produced by including a binder component to the above-mentioned carbon nanofiber dispersion liquid.

As examples of the binder components, polyvinyl alcohol resin, vinyl chloride-acetate resin, acrylic resin, epoxy resin, urethane resin, alkyd resin, polyester resin, ethylene-vinyl acetate copolymer, acrylic-styrene copolymer, cellulose resin, phenolic resin, amino resin, fluorine resin, silicone resin, petroleum resin, shellac, rosin derivative, natural resin such as rubber derivatives, and the like can be named.

It is preferable that the binder component content is 5 to 60 parts by mass in 100 parts by mass of the carbon nanofiber dispersion liquid from the point of view of coatability. More preferably, the binder component content is 5 to 30 parts by mass.

Conductive coating film can be formed by applying the coating composition or the paste composition on a material followed by drying, curing, or the like. As the base material, varieties of synthetic resins, glass, ceramics, and the like, which are widely used in various fields including electric equipments and electronics, can be used. In terms of the shape, any shape such as a sheet-like shape, a film-like shape, a plate-like shape, or the like can be taken for the base material. As specific examples, polyethylene, polypropylene, polycarbonate, polyethylene terephthalate (PET) resin, acrylic resin, methacrylic resin, polyvinyl chloride, polyester resin, polyamide resin, phenolic resin or the like, can be named. However, the choice of the synthetic resin is not particularly limited by the examples.

This conductive coating film has a low surface resistivity. When it thickness is 2 to 3 μm, preferably, the surface resistivity is $1 \times 10^8 \Omega/\square$ (Ω/sq.) or less. More preferably, the surface resistivity is $1 \times 10^7 \Omega/\square$. Furthermore, this conductive coating film has a low haze value. Preferably, the haze value of the conductive film is 10% or less. More preferably, it is 7% or less. Even more preferably, it is 5% or less. Also, the carbon nanofiber dispersion liquid has an excellent dispersion stability. Thus, the haze value after 3 months is 10% or less preferably. More preferably, the haze value after 3 months is 7% or less. Even more preferably, it is 5% or less. The haze value is measured with a haze meter.

[Producing Method]

The carbon nanofiber dispersion liquid can be produced by mixing both of the above-described alkanolamine and the above-described chelating agent in the solvent allowing them to disperse.

Apparatuses used for mixing and dispersing are not particularly limited. For example, an extruder, a plastograph, a ball mill, a bead mill, a sand grinder, a kneader, a Banbury mixer, an ultrasonic dispersing apparatus, calendar rolls, or the like can be used.

Materials in intended shapes can be obtained by coating a base material with the carbon nanofiber dispersion liquid, injecting the liquid into a mold, or the like. For example, transparent conductive film can be obtained by forming the coating film. Also, bulk bodies utilizing electrical conductivity, heat conductivity, the properties of the carbon nanofiber such as the black pigment can be formed. Furthermore, composite molded body can be obtained by adding a fixing agent to the molded body.

The coating composite or the paste composite can be formed by adding the binder component to the carbon nanofiber dispersion liquid. Also, additional additive agents can be included to the carbon nanofiber dispersion liquid if needed.

Specifically, the conductive coating material or paste can be obtained by adding a binder component such as acrylic resin or the like, for example.

Coating film or conductive coating film having optical properties can be formed by applying the coating composition or the paste composition on the base material in an appropriate thickness and drying it. A cured coating film with a high strength can be formed using a curing method, such as baking or the like, in accordance with each binder component. Also, a black coating film, a conductive coating film, or the like can be formed.

The film forming method is not particularly limited. Application and printing of the coating composition on a base material can be performed by a conventional method, such as spray coating, dip coating, roll coating, spin coating, screen printing, a method using an applicator, or the like. Then, if needed, the coating composition is heated in order to evaporate water or solvent, and the coating film is dried and cured. Heating, ultraviolet irradiation, or the like may be performed in this step.

In a case where the film is needed to be combined with other filler, any filler or additive agent can be easily combined to the carbon nanofibers by adding them to the carbon nanofiber dispersion liquid. Alternatively, the carbon nanofiber dispersion liquid can be combined easily to a solvent or a polymer material, in which the filler is dispersed in advance. As described above, the carbon nanofibers can be mixed with other materials very easily by utilizing the carbon nanofiber dispersion liquid of the present invention as a master dispersion liquid.

EXAMPLES

The present invention is explained by Examples below. However, the present invention is not limited specifically by the description of Examples.

Dispersion liquids were prepared by combining the carbon nanofibers (catalyst: CoMg-based), alkanolamine, chelating agents, and solvents shown in TABLE 1 using a bead mill. The amounts shown in TABLE 1 indicate parts by mass. Physical properties of the carbon nanofibers used were as described below. The aspect ratio was 5 to 1000. The distance of [002] lattice planes in a graphite layer, which is measured by X-ray diffraction, was 0.337 nm to 0.345 nm. The volume resistivity of the compact was 0.03 to 0.07 $\Omega \cdot cm$. The light transmittance of toluene was 98 to 99%.

The coating materials were prepared by mixing acrylic resin solution to the prepared dispersion liquids for the carbon nanofiber content in the solid content of the dried coating film to be 4.5% by mass. The coating materials were applied to a polyester film with a thickness of 100 μm with the bar coater No. 8 for the amount of coating to be 0.25 $(g/m^2)$. Then, the coating films were produced by drying them at 80° C. for 3 minutes.

The haze value of the carbon nanofiber dispersion liquid was measured. Also, the surface resistivity and the haze value of the obtained coating films were measured. Also, these haze values were measured after storing the carbon nanofiber dispersion liquids at room temperature for 3 months. The haze values (%) were measured with a haze meter manufactured by SUGA TEST INSTRUMENTS Co. The haze value of the dispersion liquid was measured by placing a diluted liquid, which was obtained by diluting the carbon nanofibers in a dispersion media for the concentration of the carbon nanofiber to be 40 ppm, in a quartz cell with an optical length of 3 mm including the have value of the quartz cell (0.3%). The haze values of the coating films were measured including the haze value of the polyester film (1.8%), which was the base film. The surface resistivity $(\Omega/\square)$ of the coating films was measured with the HIRESTAUP manufactured by MITSUBISHI CHEMICAL Co. The measurement results are shown in TABLE 2.

TABLE 1

| | CNF | | | Alkanolamine | | Chelating agent | | Solvent | |
| | Carbon source | Fiber diameter (nm) | Amount | Type | Amount | Type | Amount | Type | Amount |
| --- | --- | --- | --- | --- | --- | --- | --- | --- | --- |
| Example 1 | CO | 10 | 5 | Diisopropanolamine | 10 | Tartaric acid | 10 | Ethanol | 75 |
| Example 2 | CO | 10 | 1 | Diisopropanolamine | 5 | HEDTA | 0.01 | Isopropanol | 93.99 |
| Example 3 | CO | 20 | 10 | Diisopropanolamine | 0.1 | Gluconic acid | 5 | Water | 84.9 |
| Example 4 | CO | 20 | 3 | Monoisopropanolamine | 3 | HEDP | 3 | Water | 91 |
| Example 5 | CO | 15 | 15 | Monoisopropanolamine | 40 | Gluconic acid | 8 | Ethyl acetate | 37 |
| Example 6 | CO | 15 | 5 | Monoisopropanolamine | 30 | Tartaric acid | 1 | Isopropanol | 64 |
| Example 7 | CO | 3 | 0.01 | Triisopropanolamine | 20 | HEDP | 0.1 | NMP | 79.89 |
| Example 8 | CO | 80 | 2 | Triisopropanolamine | 5 | HEDTA | 1 | Cyclohexanone | 92.5 |
| Example 9 | CO | 50 | 8 | Triisopropanolamine | 8 | Gluconic acid | 4 | Ethanol | 80 |
| Example 10 | CO | 100 | 10 | Monoisopropanolamine | 20 | HEDTA | 5 | Water | 65 |
| Example 11 | CO | 80 | 20 | Monoisopropanolamine | 10 | HEDP | 2 | Isopropanol | 68 |
| Example 12 | $C_2H_6$ | 10 | 5 | Diisopropanolamine | 10 | Tartaric acid | 10 | Ethanol | 75 |
| Example 13 | $CH_4$ | 10 | 5 | Diisopropanolamine | 10 | Tartaric acid | 10 | Ethanol | 75 |
| Comparative Example 1 | CO | 10 | 5 | Diisopropanolamine | 10 | — | — | Ethanol | 85 |
| Comparative Example 2 | CO | 10 | 5 | — | — | Tartaric acid | 10 | Ethanol | 85 |
| Reference Example 1 | CO | 120 | 10 | Triisopropanolamine | 20 | HEDTA | 5 | Water | 65 |
| Reference Example 2 | CO | 20 | 10 | Monoisopropanolamine | 0.05 | Gluconic acid | 5 | Water | 84.95 |
| Reference Example 3 | CO | 15 | 15 | Diisopropanolamine | 45 | Gluconic acid | 8 | Ethyl acetate | 32 |
| Reference Example 4 | CO | 10 | 1 | Monoisopropanolamine | 5 | HEDTA | 0.005 | Isopropanol | 93.995 |
| Reference Example 5 | CO | 10 | 5 | Monoisopropanolamine | 10 | Tartaric acid | 15 | Ethanol | 70 |

TABLE 2

| | Dispersion liquid Haze (%) | | Coating film | | | |
|---|---|---|---|---|---|---|
| | | | Surface resistivity ($\Omega/\square$) | | Haze (%) | |
| | After dispersion | After 3 months | After dispersion | After 3 months | After dispersion | After 3 months |
| Example 1 | 0.6 | 0.6 | $3.1 \times 10^6$ | $3.1 \times 10^6$ | 2.4 | 2.4 |
| Example 2 | 0.5 | 0.5 | $8.5 \times 10^6$ | $8.5 \times 10^6$ | 2.4 | 2.4 |
| Example 3 | 0.9 | 0.9 | $2.6 \times 10^6$ | $2.6 \times 10^6$ | 2.6 | 2.6 |
| Example 4 | 0.6 | 0.6 | $5.2 \times 10^6$ | $5.2 \times 10^6$ | 2.5 | 2.5 |
| Example 5 | 0.8 | 0.8 | $2.2 \times 10^6$ | $2.2 \times 10^6$ | 2.8 | 2.8 |
| Example 6 | 0.7 | 0.7 | $3.4 \times 10^6$ | $3.4 \times 10^6$ | 2.0 | 2.0 |
| Example 7 | 0.5 | 0.5 | $9.8 \times 10^6$ | $9.8 \times 10^6$ | 2.2 | 2.2 |
| Example 8 | 1.2 | 1.2 | $4.5 \times 10^6$ | $4.5 \times 10^6$ | 2.9 | 2.9 |
| Example 9 | 1.0 | 1.0 | $2.7 \times 10^6$ | $2.7 \times 10^6$ | 2.5 | 2.5 |
| Example 10 | 2.2 | 2.2 | $9.3 \times 10^5$ | $9.3 \times 10^5$ | 3.8 | 3.8 |
| Example 11 | 1.0 | 1.0 | $9.8 \times 10^5$ | $9.8 \times 10^5$ | 2.7 | 2.7 |
| Example 12 | 5.2 | 5.2 | $7.9 \times 10^6$ | $7.9 \times 10^6$ | 6.6 | 6.6 |
| Example 13 | 4.3 | 4.3 | $8.3 \times 10^6$ | $8.3 \times 10^6$ | 5.7 | 5.7 |
| Comparative Example 1 | Not dispersed | — | — | — | — | — |
| Comparative Example 2 | Not dispersed | — | — | — | — | — |
| Reference Example 1 | 25.2 | 25.2 | $7.4 \times 10^5$ | $7.4 \times 10^5$ | 27.2 | 27.2 |
| Reference Example 2 | 7.4 | 32.1 | $8.5 \times 10^7$ | $3.2 \times 10^8$ | 9.0 | 34.0 |
| Reference Example 3 | 8.3 | 12.6 | $4.6 \times 10^6$ | $7.3 \times 10^6$ | 10.2 | 14.1 |
| Reference Example 4 | 10.2 | 38.3 | $4.1 \times 10^7$ | $1.2 \times 10^8$ | 12.1 | 40.1 |
| Reference Example 5 | 0.6 | 8.4 | $4.5 \times 10^6$ | $1.6 \times 10^7$ | 2.4 | 10.1 |

As shown in TABLE 2, the haze values of the dispersion liquids were low after dispersion in Examples 1 to 13. The low haze values in all Examples 1 to 13 were unchanged after 3 months. Both of the surface resistivity and the haze values of the coating films were low. The surface resistivity and the haze values of the coating films manufactured by using the carbon nanofiber dispersion liquids stored for 3 months were not changed. Contrary to that, the carbon nanofibers were not dispersed in Comparative Example 1, in which alkanolamine was not included, and Comparative Example 2, in which chelating agent was not included. The haze values of the dispersion liquid and the coating film were relatively high in Reference Example 1, in which the carbon nanofibers having the fiber diameter of 120 nm were included. The dispersibility of the dispersion liquid was not excellent, and the conductivity of the coating film was relatively high in Reference Example 2, in which the alkanolamine content was low. The dispersibility of the dispersion liquid was not excellent, and the haze value of the coating film was relatively high in Reference Example 3, in which the alkanolamine content was high. The haze value of the dispersion liquid was relatively high, the dispersibility and the dispersion stability of the dispersion liquid were not excellent, and the surface resistivity of the coating film was relatively high in Reference Example 4, in which the chelating agent content was low. The dispersion stability was not excellent in Reference Example 5, in which the chelating agent content was high. In addition, the surface resistivity of the coating film formed by using the dispersion liquid stored for 3 months was relatively high in Reference Example 5.

As explained above, the carbon nanofiber dispersion liquid of the present invention is very useful, since the dispersibility and the dispersion stability of the dispersion liquid are excellent, and the conductive coating film formed by using this carbon nanofiber dispersion liquid has a low surface resistivity and a low haze value. In addition, the coating composition and the paste composition can be easily formed, since the carbon nanofiber dispersion liquid has excellent dispersibility.

INDUSTRIAL APPLICABILITY

The carbon nanofiber dispersion liquid, the coating composition, and the paste composition of the present invention are very useful for forming a conductive coating film used for a transparent conductor, an antistatic, and various batteries/secondary batteries, for example.

The invention claimed is:
1. A carbon nanofiber dispersion liquid comprising:
   a solvent;
   carbon nanofibers synthesized by catalytic chemical vapor deposition methods using a catalyst;
   an alkanolamine; and
   a chelating agent;
   wherein the alkanolamine is at least one selected from a group consisting of monoisopropanolamine, diisopropanolamine, and triisopropanolamine, and
   the chelating agent coordinates to the catalyst of the carbon nanofibers.
2. The carbon nanofiber dispersion liquid according to claim 1, wherein the chelating agent is at least one selected from a group consisting of aminocarboxylic acid chelating agent, phosphonic acid chelating agent, gluconic acid chelating agent, and organic acid.
3. The carbon nanofiber dispersion liquid according to claim 2, wherein 0.1 to 40 parts by mass of the alkanolamine is included in 100 parts by mass of the carbon nanofiber dispersion liquid.

4. The carbon nanofiber dispersion liquid according to claim 3, wherein 0.01 to 10 parts by mass of the chelating agent is included in 100 parts by mass of the carbon nanofiber dispersion liquid.

5. The carbon nanofiber dispersion liquid according to claim 4, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

6. The carbon nanofiber dispersion liquid according to claim 3, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

7. The carbon nanofiber dispersion liquid according to claim 2, wherein 0.01 to 10 parts by mass of the chelating agent is included in 100 parts by mass of the carbon nanofiber dispersion liquid.

8. The carbon nanofiber dispersion liquid according to claim 7, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

9. The carbon nanofiber dispersion liquid according to claim 2, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

10. The carbon nanofiber dispersion liquid according to claim 1, wherein 0.1 to 40 parts by mass of the alkanolamine is included in 100 parts by mass of the carbon nanofiber dispersion liquid.

11. The carbon nanofiber dispersion liquid according to claim 10, wherein 0.01 to 10 parts by mass of the chelating agent is included in 100 parts by mass of the carbon nanofiber dispersion liquid.

12. The carbon nanofiber dispersion liquid according to claim 11, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

13. The carbon nanofiber dispersion liquid according to claim 10, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

14. The carbon nanofiber dispersion liquid according to claim 1, wherein 0.01 to 10 parts by mass of the chelating agent is included in 100 parts by mass of the carbon nanofiber dispersion liquid.

15. The carbon nanofiber dispersion liquid according to claim 14, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

16. The carbon nanofiber dispersion liquid according to claim 1, wherein
a diameter of the carbon nanofiber is 1 to 100 nm,
an aspect ratio of the carbon nanofiber is 5 or more, and
a distance of [002] lattice plane in a graphite layer of the carbon nanofiber is 0.35 nm or less, the distance being measured by X-ray diffraction.

17. A coating composition comprising the carbon nanofiber dispersion liquid according to claim 1, and a binder component.

18. A conductive coating film formed by the coating composition according to claim 17.

19. A paste composition comprising the carbon nanofiber dispersion liquid according to claim 1, and a binder component.

20. A conductive coating film formed by the paste composition according to claim 19.

* * * * *